(12) United States Patent
Glendenning et al.

(10) Patent No.: US 11,347,219 B2
(45) Date of Patent: May 31, 2022

(54) TRAILER FOR AUTONOMOUS DELIVERY

(71) Applicant: GM Cruise Holdings LLC, San Francisco, CA (US)

(72) Inventors: Jake Glendenning, Oakland, CA (US); Yung Chang Ko, San Francisco, CA (US)

(73) Assignee: GM Cruise Holdings, LLC, San Francisco, CA (US)

( * ) Notice: Subject to any disclaimer, the term of this patent is extended or adjusted under 35 U.S.C. 154(b) by 203 days.

(21) Appl. No.: 16/397,592

(22) Filed: Apr. 29, 2019

(65) Prior Publication Data

US 2020/0341467 A1 Oct. 29, 2020

(51) Int. Cl.

| *G05D 1/00* | (2006.01) |
|---|---|
| *B62D 13/00* | (2006.01) |
| *G06Q 10/08* | (2012.01) |
| *G08G 1/00* | (2006.01) |
| *G08G 1/0968* | (2006.01) |
| *G07C 5/00* | (2006.01) |
| *B60L 58/12* | (2019.01) |

(52) U.S. Cl.
CPC ............ *G05D 1/0088* (2013.01); *B60L 58/12* (2019.02); *B62D 13/00* (2013.01); *G06Q 10/0832* (2013.01); *G07C 5/008* (2013.01); *G08G 1/096833* (2013.01); *G08G 1/202* (2013.01); *G05D 2201/0213* (2013.01)

(58) Field of Classification Search
CPC .......... G05D 1/0088; G05D 2201/0213; B60L 58/12; B62D 13/00; G06Q 10/0832; G07C 5/008; G08G 1/096833; G08G 1/202
See application file for complete search history.

(56) References Cited

U.S. PATENT DOCUMENTS

| 2007/0114757 A1* | 5/2007 | Vickroy | B60D 1/62 280/422 |
|---|---|---|---|
| 2016/0364823 A1* | 12/2016 | Cao | G06Q 50/30 |
| 2017/0316701 A1* | 11/2017 | Gil | E05F 15/77 |
| 2018/0194575 A1* | 7/2018 | Anderson | B65G 47/02 |
| 2018/0202822 A1* | 7/2018 | DeLizio | G01C 21/34 |
| 2018/0336510 A1* | 11/2018 | DaCosta | G06Q 10/063112 |
| 2019/0025817 A1* | 1/2019 | Mattingly | H04L 9/0825 |
| 2019/0056736 A1* | 2/2019 | Wood | B60W 30/00 |
| 2019/0124164 A1* | 4/2019 | Qiu | G06Q 10/083 |
| 2019/0317498 A1* | 10/2019 | Mere | H04W 4/40 |

* cited by examiner

*Primary Examiner* — Jelani A Smith
*Assistant Examiner* — Frank T Glenn, III
(74) *Attorney, Agent, or Firm* — Polsinelli, PC (57) ABSTRACT

The disclosed technology provides a delivery trailer to be hitched to an autonomous vehicle for autonomous delivery of packages. The delivery trailer can include sensors to provide data to the autonomous vehicle to which it is to overcome limitations caused by any occlusion of sensors on the autonomous vehicle by the trailer. Furthermore, the present technology addresses several challenges related to autonomous package delivery.

19 Claims, 6 Drawing Sheets

TRAILER FOR AUTONOMOUS DELIVERY

TECHNICAL FIELD

The present technology pertains to autonomous package delivery, and more specifically to a delivery trailer to be hitched to an autonomous vehicle for package delivery.

BACKGROUND

An autonomous vehicle is a motorized vehicle that can navigate without a human driver. An exemplary autonomous vehicle includes a plurality of sensor systems, such as, but not limited to, a camera sensor system, a lidar sensor system, a radar sensor system, amongst others, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system.

Many autonomous vehicles, and especially those optimized to provide ridesharing services, do not have a lot of room for excess cargo. Cargo space in a traditional automobile is often utilized by the internal computing system and other systems used for autonomously piloting the vehicle. Meanwhile, autonomous vehicles are an ideal candidate to handle 'last mile' package delivery since their rideshare duties already take them on routes to and near the final delivery locations of many packages.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

The disclosed technology addresses the need in the art for a delivery trailer to be hitched to an autonomous vehicle for autonomous delivery of packages. Many autonomous vehicles, and especially those optimized to provide ridesharing services, do not have a lot of room for excess cargo. Meanwhile, autonomous vehicles are an ideal candidate to handle 'last mile' package delivery since their rideshare duties already take them on routes to and near final delivery locations of many packages. As autonomous vehicles do not have much cargo space, they need external cargo space before they can be used as a viable option for package delivery. Therefore, the present technology provides a trailer that can be hitched to an autonomous vehicle.

Attaching a trailer to an autonomous vehicle can occlude sensors on the autonomous vehicle that would prevent the autonomous vehicle from being able to drive, or at least prevent the autonomous vehicle from executing some routine driving maneuvers. Accordingly, the present technology provides a trailer that can help the autonomous vehicle overcome the occlusion that the trailer causes.

Additionally, autonomous package delivery by a trailer attached to an autonomous vehicle also presents many challenges, and the trailer of the present technology overcomes these challenges. For example, when the autonomous vehicle is optimized for providing rideshare services, and the trailer of the present technology is optimized for package delivery, communication between the autonomous vehicle and the trailer needs to be achieved so that the autonomous vehicle can know where it needs to go, and when a package has been delivered so that it can move to its next destination.

The trailer of the present technology solves at least these problems and provides other benefits as will be apparent from the figures and description provided herein.

Figure 1:
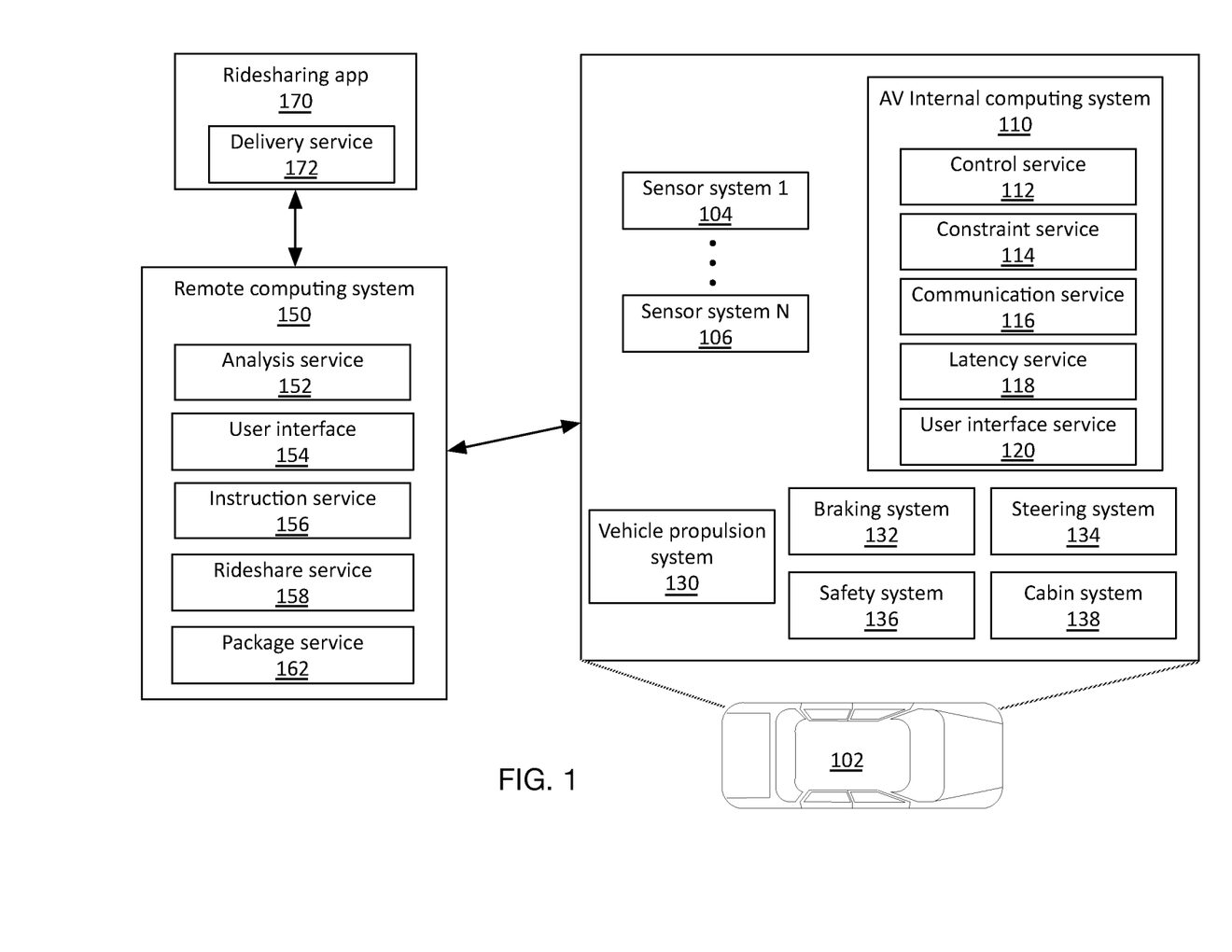
FIG. 1 shows an example embodiment of an autonomous vehicle system and supporting devices in accordance with some aspects of the present technology.

FIG. 1 illustrates environment 100 that includes an autonomous vehicle 102 in communication with a remote computing system 150.

The autonomous vehicle 102 can navigate about roadways without a human driver based upon sensor signals output by sensor systems 104-106 of the autonomous vehicle 102. The autonomous vehicle 102 includes a plurality of sensor systems 104-106 (a first sensor system 104 through an Nth sensor system 106). The sensor systems 104-106 are of different types and are arranged about the autonomous vehicle 102. For example, the first sensor system 104 may be a camera sensor system and the Nth sensor system 106 may be a lidar sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 102 further includes several mechanical systems that are used to effectuate appropriate motion of the autonomous vehicle 102. For instance, the mechanical systems can include but are not limited to, a vehicle propulsion system 130, a braking system 132, and a steering system 134. The vehicle propulsion system 130 may include an electric motor, an internal combustion engine, or both. The braking system 132 can include an engine brake, brake pads, actuators, and/or any other suitable componentry that is configured to assist in decelerating the autonomous vehicle 102. The steering system 134 includes suitable componentry that is configured to control the direction of movement of the autonomous vehicle 102 during navigation.

The autonomous vehicle 102 further includes a safety system 136 that can include various lights and signal indicators, parking brake, airbags, etc. The autonomous vehicle 102 further includes a cabin system 138 that can include cabin temperature control systems, in-cabin entertainment systems, etc.

The autonomous vehicle 102 additionally comprises an autonomous vehicle (AV) internal computing system 110 that is in communication with the sensor systems 104-106 and the systems 130, 132, 134, 136, and 138. The AV internal computing system includes at least one processor and at least one memory having computer-executable instructions that are executed by the processor. The computer-executable instructions can make up one or more services responsible for controlling the autonomous vehicle 102, communicating with remote computing system 150, receiving inputs from passengers or human co-pilots, logging metrics regarding data collected by sensor systems 104-106 and human co-pilots, etc.

The AV internal computing system 110 can include a control service 112 that is configured to control operation of the vehicle propulsion system 130, the braking system 132, the steering system 134, the safety system 136, and the cabin system 138. The control service 112 receives sensor signals from the sensor systems 104-106 as well communicates with other services of the AV internal computing system 110 to effectuate operation of the autonomous vehicle 102. In some embodiments, control service 112 may carry out operations in concert one or more other systems of autonomous vehicle 102.

The AV internal computing system 110 can also include a constraint service 114 to facilitate safe propulsion of the autonomous vehicle 102. The constraint service 114 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 112.

The AV internal computing system 110 can also include a communication service 116. The communication service 116 can include both software and hardware elements for transmitting and receiving signals from/to the remote computing system 150. The communication service 116 is configured to transmit information wirelessly over a network, for example, through an antenna array that provides cellular (long-term evolution (LTE), 3G, 5G, etc.) communication.

In some embodiments, one or more services of the AV internal computing system 110 are configured to send and receive communications to remote computing system 150 for such reasons as reporting data for training and evaluating machine learning algorithms, requesting assistance from the remoting computing system 150 or a human operator via the remote computing system 150, software service updates, ridesharing pick-up and drop-off instructions etc.

The AV internal computing system 110 can also include a latency service 118. The latency service 118 can utilize timestamps on communications to and from the remote computing system 150 to determine if a communication has been received from the remote computing system 150 in time to be useful. For example, when a service of the AV internal computing system 110 requests feedback from remote computing system 150 on a time-sensitive process, the latency service 118 can determine if a response was timely received from the remote computing system 150 as information can quickly become too stale to be actionable. When the latency service 118 determines that a response has not been received within a threshold, the latency service 118 can enable other systems of autonomous vehicle 102 or a passenger to make necessary decisions or to provide the needed feedback.

The AV internal computing system 110 can also include a user interface service 120 that can communicate with the cabin system 138 in order to provide information (or receive information) to a human co-pilot or human passenger. In some embodiments, a human co-pilot or human passenger may be required to evaluate and override a constraint from the constraint service 114, or the human co-pilot or human passenger may wish to provide an instruction to the autonomous vehicle 102 regarding destinations, requested routes, or other requested operations.

As described above, the remote computing system 150 is configured to send/receive a signal from the autonomous vehicle 102 regarding reporting data for training and evaluating machine learning algorithms, requesting assistance from the remote computing system 150 or a human operator via the remote computing system 150, software service updates, rideshare pick-up and drop-off instructions, etc.

The remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by the autonomous vehicle 102.

The remote computing system 150 can also include a user interface service 154 that is configured to present metrics, video, pictures, sounds reported from the autonomous vehicle 102 to an operator of remote computing system 150. The user interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, the instructions service 156 can prepare instructions to one or more services of the autonomous vehicle 102 or a co-pilot or passenger of the autonomous vehicle 102. Additionally, the instruction service 156 can be responsible for sending route plans for autonomous vehicle 102 to execute such as to complete a rideshare trip or a package delivery.

The remote computing system 150 can also include a rideshare service 158 configured to interact with ridesharing application 170 operating on passenger computing devices. The rideshare service 158 can receive requests to be picked up or dropped off from passenger ridesharing application 170 and can dispatch autonomous vehicle 102 for the trip. The rideshare service 158 can also act as an intermediary between the ridesharing application 170 and the autonomous vehicle 102 wherein a passenger might provide instructions to the autonomous vehicle 102 to go around an obstacle, change routes, honk the horn, etc.

The remote computing system 150 can also include a package service 162 configured to interact with the ridesharing application 170 including a delivery service 172. A user operating ridesharing application 170 can interact with the delivery service 172 to specify information regarding a package to be delivered using the autonomous vehicle 102. The specified information can include package dimensions, package weight, a destination address, etc. The package service 162 interacting with the delivery service 172 can provide a package identifier to the user for package labeling and tracking. The package delivery service 172 can also inform a user of where to bring their labeled package for drop off. In some embodiments, a user can request the autonomous vehicle 102 come to them to pick up the package. While the delivery service 172 has been shown as part of the ridesharing application 170, it will be appreciated by those of ordinary skill in the art that the delivery service 172 can be its own separate application.

One beneficial aspect of utilizing the autonomous vehicle 102 for both ridesharing and package delivery is increased utilization of the autonomous vehicle 102. The instruction service 156 can continuously keep the autonomous vehicle 102 engaged in a productive itinerary between rideshare trips by filling what otherwise would have been idle time with productive package delivery trips.

Figure 2:
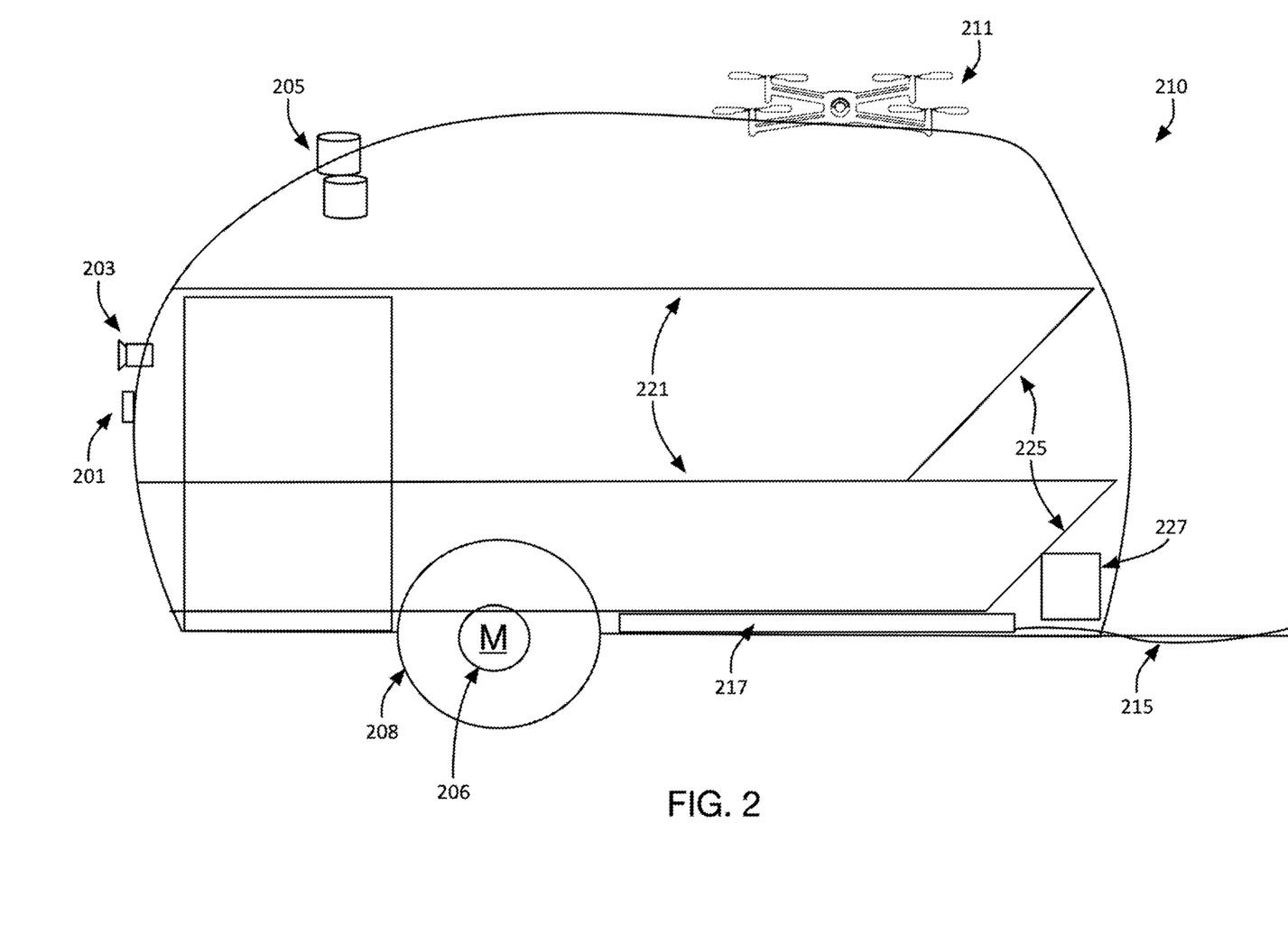
FIG. 2 shows an example embodiment of a trailer for autonomous package delivery in accordance with some aspects of the present technology.

FIG. 2 illustrates an example embodiment of a trailer 210 in accordance with some aspects of the present technology. While FIG. 2 illustrates the arrangement of various parts and components of the trailer 210, it should be appreciated by those of ordinary skill that the illustrated arrangement and configurations are by way of example only. Various parts and components of the trailer 210 can be positioned and arranged differently than shown in FIG. 2. Additionally, more or less than the number of components shown may exist.

As illustrated in FIG. 2, the trailer 210 can include a number of sensors including radar 201, camera 203, and lidar 205. These will be discussed in greater detail with respect to FIG. 3.

The trailer 210 can be equipped with at least one package support surface 221, such as for example, shelving, or levels for supporting and storing packages. The at least one package support surface 221 can communicate with or have an integrated package manipulation mechanism (not shown) such as at least one conveyor belt or individually driven wheels arranged in multiple directions. The package manipulation mechanism can be driven by at least one package arrangement motor configured to drive the package manipulation mechanism to move the package along one or more planes of movement about the trailer 210.

The package manipulation mechanism would allow for automated maneuvering of packages inside of the trailer 210 to maneuver packages into safe positions for transport and to maneuver packages to a drop-off mechanism when the package is ready for delivery.

In embodiments where there is more than one package support surface 221, the package support surfaces 221 can be mechanically joined by at least one ramp 225 configured to move the package from one package support surface 221 to another. In some embodiments, the ramp 225 can include a conveyor capable of transporting a package from a lower package support surface 221 to a higher package support surface 221 or vice versa. In some embodiments, the package support surfaces 221 can be joined by an elevator configured to move a package from one package support surface 221 to another.

In some embodiments, the at least one package support surface 221 can be attached to the trailer 210 by an adjustable rail such that height or elevation of the package support surface 221 can be adjusted. Similarly, the number of package support surfaces 221 can also be adjustable. In this way, the trailer 210 can accommodate many smaller packages or just a few larger packages.

The trailer 210 also includes a door 207. In some embodiments, the door 207 is an opening for both loading and unloading of the trailer 210, while in some embodiments separate doors can be used for loading and unloading. While FIG. 2 illustrates door 207 at a particular location on the side of trailer 210, it will be appreciated by those of ordinary skill in the art that the door could go on any surface of the trailer including on the top surface of the trailer to facilitate lifting of a package out of the trailer 210, or on the bottom surface of the trailer 210 to facilitate dropping the package.

The door 207 can be in any one of a variety of configurations such as a garage door configuration, a side hinged or bottom hinged chute door configuration, a drawbridge type configuration, etc.

The trailer 210 also includes a package release mechanism (not shown). The package release mechanism can be integrated with the door 207 or can be a separate mechanism. For example, the door 207 can be a bottom hinged chute door configured to receive a package before opening and thereby transferring the package outside of the trailer and depositing the package. In another example, the door 207 can have an integrated slide or lift mechanism configured to receive the package and transfer the package to the outside of the trailer 210—for example by dropping the package onto a sidewalk.

In some embodiments, the package release mechanism can be an ejection mechanism configured to provide a small force to the package to eject it through door 207 and out of the trailer 210.

In some embodiments, the package release mechanism can provide a pick-up zone for a package delivery drone 211. FIG. 2 illustrates the package delivery drone 211 mounted to the top of trailer 210. In some embodiments, there can be several package delivery drones 211 mounted to the top of the trailer or otherwise housed in a drone bay within the trailer 210. While the package delivery drone 211 is illustrated as a copter type drone, the delivery drone 211 could be any type of delivery drone including a land travel type drone which relies upon wheels or ambulating appendages for movement.

The package release mechanism can deposit a package on the side (including behind or in front) of the trailer 210 in a location where the package delivery drone 211 can engage with the package to transport it to a package delivery zone. In some embodiments, the package release mechanism can provide the package at the top of the trailer where package delivery drone 211 can engage with the package.

As illustrated in FIG. 2, trailer 210 can also include battery 217. The battery 217 can be configured to power the operations of the trailer 210 including the sensors 201, 203, 205, the package manipulation mechanism. The battery 217 can also be used to charge package delivery drone 211, to operate door 207 and package release mechanism, to operate brakes, to power the trailer computing system 227, and to power package monitoring equipment, etc.

In some embodiments, the battery 217 is a rechargeable battery capable of wireless charging or plug-in charging.

Figure 3:
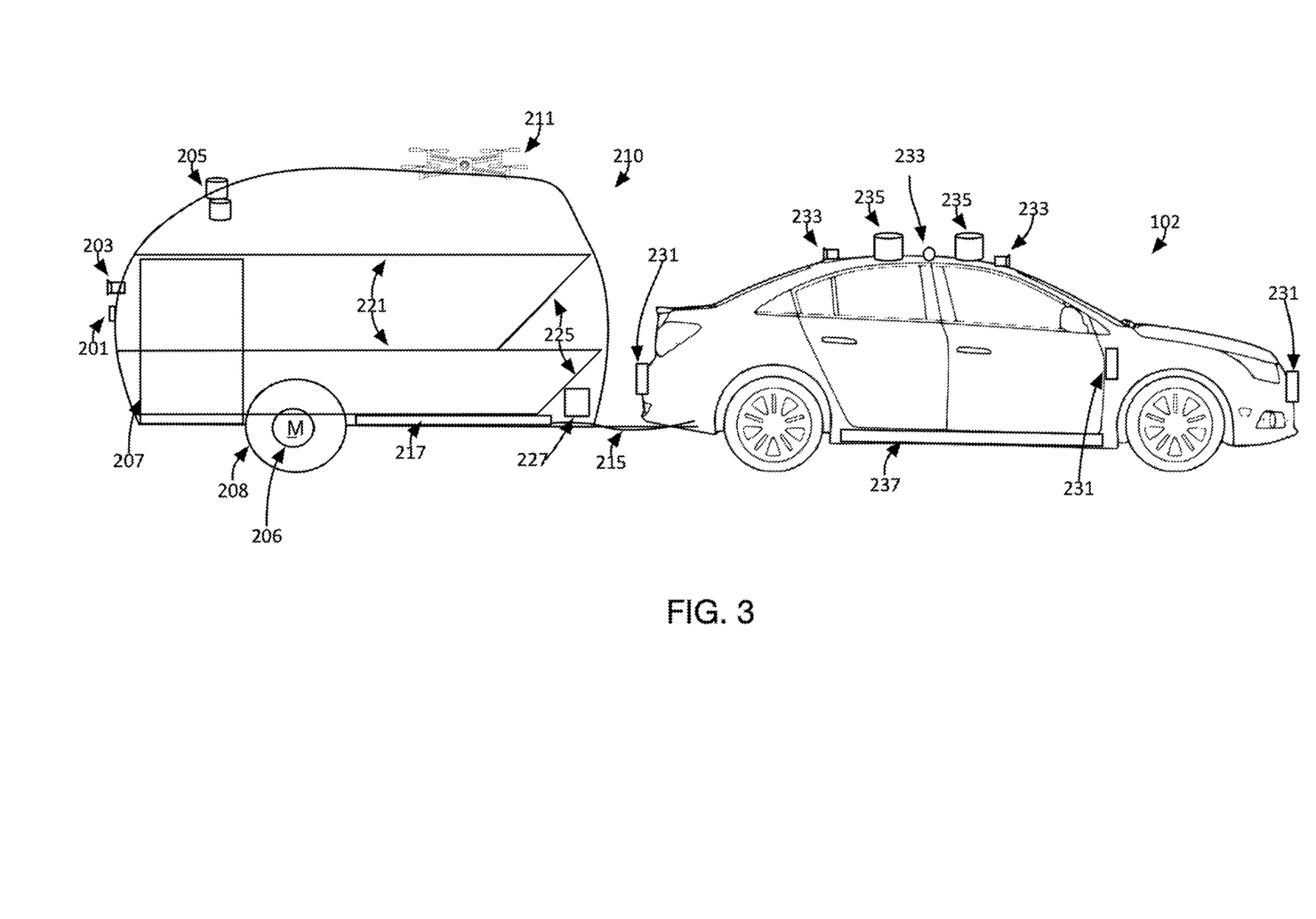
FIG. 3 shows an example embodiment of an autonomous vehicle and a trailer for autonomous package delivery in accordance with some aspects of the present technology.

In some embodiments, the trailer 210 can be configured with an electric motor 206 to provide propulsion to the trailer wheels 208 to aid in trailer movements such as reversing or moving the trailer into position to be hitched to an autonomous vehicle 250 (shown in FIG. 3). In some embodiments, the electric motor 206 can also be used to assist in breaking or to assist in charging the battery 217 using regenerative braking techniques.

While not shown in FIG. 2, in some embodiments, the trailer 210 can be provided with a front wheel to support the front side of trailer 210 when it is not attached to a vehicle.

The trailer 210 can also include a trailer computing system 227. The trailer computing system 227 can be configured to control the operations of the trailer 210 including of sensors 201, 203, 205, package manipulation means, door 207, release of package delivery drones 211, charging of the battery 217, interfacing with the remote computing system 150, and interfacing with autonomous vehicle 102, etc.

In some embodiments, the trailer 210 also includes a camera system (not shown) for monitoring cargo within trailer 210. In some embodiments, the camera system can be used to monitor the status of cargo. In some embodiments, the camera system can also be used to recognize machine-readable codes on packages and to identify the location of packages within trailer 210. When used in collaboration with the trailer computing system 227, packages can be arranged within the trailer to provide for a safe distribution, especially weight distribution, of the packages within the trailer.

The packages to be delivered by the trailer 210 can be marked with RFID tags, or a machine-readable identifier such as a barcode or QR code, and the trailer 210 can be equipped with appropriate equipment to read the RFID tag or barcode or QR code to identify the package. As will be described in more detail below, the trailer 210 can identify the package upon receiving the package so that it can communicate with the remote computing system 150 to learn details of the package. The trailer 210 can also identify the package to facilitate storing the package and moving the package within the trailer. Additionally, the trailer 210 can also identify the package inside the trailer and outside the trailer 210 at the time of delivery.

FIG. 3 illustrates the trailer 210 hitched to the autonomous vehicle 102. When the trailer 210 is hitched to the autonomous vehicle 102, the trailer 210 can occlude various sensors on the autonomous vehicle 102 causing blind spots to the autonomous vehicle's sensors. For example, as illustrated in FIG. 3, the autonomous vehicle 102 includes a radar 231 on its rear bumper, a rear-facing camera 233 on its roof, and lidar 235. Some of these sensors are now occluded by the trailer 210.

Accordingly, the trailer 210 can communicate inputs from its sensors (e.g., radar 201, camera 203, lidar 205) to the autonomous vehicle 102. In addition to a mechanical hitch, and typical safety light connections accompanying conventional hitches, the present technology includes at least one electrical connector 215 providing a high-speed data connection for connecting the trailer computing system 227 to the AV internal computing system 110 of the autonomous vehicle 102.

The electrical connector 215 can include any suitable data connection cable with a releasable connector that is able to maintain its performance over multiple connection and disconnection cycles. In some embodiments, the electrical connector 215 can be a fiber optic cable and might include an RJ45 plug to interface with an RJ45 socket on the autonomous vehicle 102.

In some embodiments, there could be several, redundant electrical connectors 215 to provide for backup channels. Additionally, any protocol for sending and receiving data over the electrical connector 215 should be robust and might include packet duplication and error checking capabilities. The data connection will require some redundancy in the link because it can provide a critical safety application. In some embodiments, the electrical connector is configured to provide one way or two-way communication between the trailer 210 and the autonomous vehicle 102.

In addition to communicating sensor data, the high-speed data link 215 can also communicate other data from the trailer 210. For example, the trailer 210 can communicate information regarding the loading of packages in the trailer, and weight distribution information using the trailer computing system 227. For example, an approximate vehicle weight might be important for the AV internal computing system 110 to learn in order to adjust driving controls. In some embodiments, the trailer computing system 227 can also communicate information regarding a package, such as a drop-off location or address to the AV internal computing system 110. The trailer computing system 227 can also receive communications from the AV internal computing system 110 of the autonomous vehicle 102 regarding the location of the autonomous vehicle 102, and in particular, when the autonomous vehicle 102 has arrived at a drop-off location for a package.

In some embodiments, the high-speed data link 215 can also be used by the AV internal computing system 110 to communicate instructions for moving the trailer 210 to the trailer computing system 227. For example, the AV internal computing system 110 can instruct the trailer computing system 227 to active a motor 206 attached to the trailer wheels 208 to aid in certain maneuvers.

In some embodiments, the at least one electrical connector 215 can include a high voltage connection for transferring power between the battery 237 of the autonomous vehicle 102 and the battery 217 of the trailer 210. In situations wherein the autonomous vehicle 102 and the trailer 210 are connected, one of the autonomous vehicle 102 and/or the trailer 210 can be charging through a wired charge port, and the other of the autonomous vehicle 102 and the trailer 210 can share power over the high voltage connection. In situations wherein the battery 217 of the trailer 210 or the battery 237 autonomous vehicle 102 is low, the other can provide backup power. In situations wherein wireless charging is provided, the combined autonomous vehicle 102 and trailer 210 would have a faster-charging speed that either the autonomous vehicle 102 or the trailer 210 would have on its own due to the large surface area for charging. In such situations, power can be distributed between the autonomous vehicle 102 and the trailer 210 using the high voltage connection to balance the charge level of the batteries 217, 237 in the trailer 210 and the autonomous vehicle 102.

While a high voltage connection provides several benefits, as outlined above, it can also provide safety concerns. Accordingly, the autonomous vehicle 102 can be equipped with a quick disconnect mechanism that is used when the AV internal computing system 110 recognizes that the autonomous vehicle 102 is about to be engaged in a collision. Likewise, the trailer 210 can include sensors (e.g., accelerometers, gyroscopes, etc.) to monitor the balance and positioning of the trailer to determine when the trailer is in an unstable position and might tip over. In such a situation, the trailer computing system 227 can send a message to the AV internal computing system 110 to disconnect the high voltage link.

In some embodiments, the autonomous vehicle 102 and the trailer 210 can autonomously hitch up or separate from each other. This would facilitate embodiments wherein the trailer 210 could be loaded and be waiting for the autonomous vehicle 102 to collect it. In some embodiments, the autonomous vehicle 102 could collect the trailer 210 from a loading facility, or even from a parking spot on the side of a road in a neighborhood.

In some embodiments, the trailer battery 217 can be fully charged when the autonomous vehicle 102 hitches to it, and the autonomous vehicle 102 can be charged from the battery 217 while in use towing the trailer 210.

In some embodiments, aspects of the AV internal computing system 110 are configured with two different driving modes: one mode normal autonomous driving, and another mode for driving with a trailer.

In the trailer driving mode, the AV internal computing system 110 is configured to utilize data from the sensors (201, 203, 205) on the trailer 210. Additionally, the AV internal computing system 110 is configured to take into account the additional dimensions of the combined autonomous vehicle 102 and trailer 210 and to account for the additional degrees of movement created by the trailer hitch. The driving dynamics of autonomous vehicle 102 are also different when towing a trailer, and the trailer driving mode of the AV internal computing system 110 is configured to take into account the heavier weight of the trailer 210 in acceleration and deceleration, and the vehicle planning algorithms account for a wider turning radius.

Figure 4:
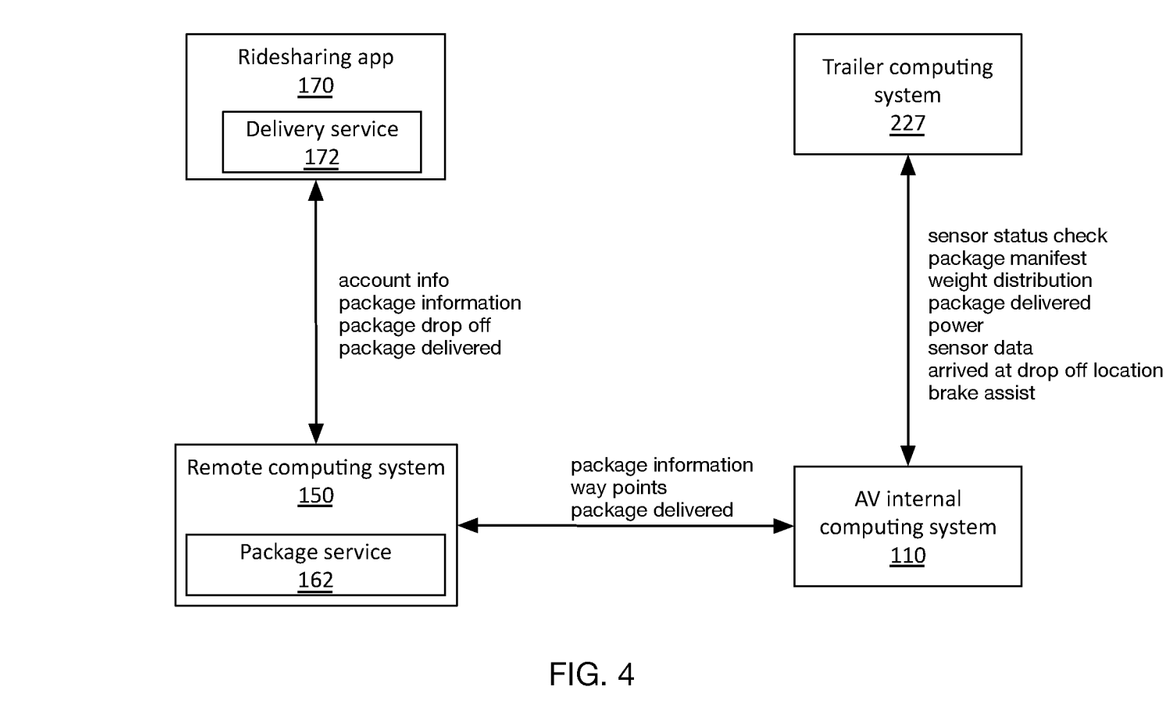
FIG. 4 shows an example communication architecture of devices involved in autonomous package delivery in accordance with some aspects of the present technology.

FIG. 4 illustrates an example block diagram showing types of communications between entities in a computing system of the present technology. FIG. 4 illustrates ridesharing application 170 having a delivery service 172. Ridesharing application 170 is an application stored and executing on a client device of the user having a user account with the remote computing system 150.

Ridesharing application 170 can interact with the remote computing system 150 which has a package service 162. Remote computing system 150 is a cloud-hosted computing system. The package service 162 is configured to receive information about a package from the ridesharing application 170 and to provide instructions to the AV internal computing system 110 regarding routes and destinations. As such, the remote computing system 150 works with package service 162 to schedule the autonomous vehicle to pick-up ridesharing passengers and/or to deliver packages. As illustrated in FIG. 4, the remote computing system 150 and the ridesharing application 170 exchange information such as user account information, information identifying a package, a package drop-off location, and information about completed or in progress package deliveries.

The remote computing system 150 is also in communication with the AV internal computing system 110. The remote computing system 150 communicates with the AV internal computing system 110 to exchange information regarding which packages are on the trailer 210, information about the identified packages including package drop-off locations, weight, and other characteristics, way points (delivery route plans) for dropping off a package, and delivery confirmations.

The trailer computing system 227 and the AV internal computing system 110 are further configured to communicate as described above to exchange communications such as sensor statuses, sensor data, trailer package manifests, weight distribution information, package delivery confirmations, power, location information including information regarding arrival at a drop-off location, and trailer operation information such as a brake assist instruction.

In some embodiments, the remote computing system 150 communicate directly with the trailer computing system 227 to exchange information regarding which packages are loaded onto the trailer 210 and information about the identified packages including package drop-off locations, weight, and other characteristics. However, in some embodiments, it is preferred to limit communications with the trailer computing system 227 for either security reasons (the trailer has a wired connection to the autonomous vehicle 102, and communications with the trailer make it vulnerable to hacking and affecting the autonomous vehicle 102), cost reasons (a communications system might be redundant considering that the autonomous vehicle 102 already has a communication system and communications with trailer computing system 227 would require building a new communication architecture), or bandwidth reasons (additional communications with the trailer consume network bandwidth and resources of the remote computing system 150 and the trailer computing system 227).

Figure 5:
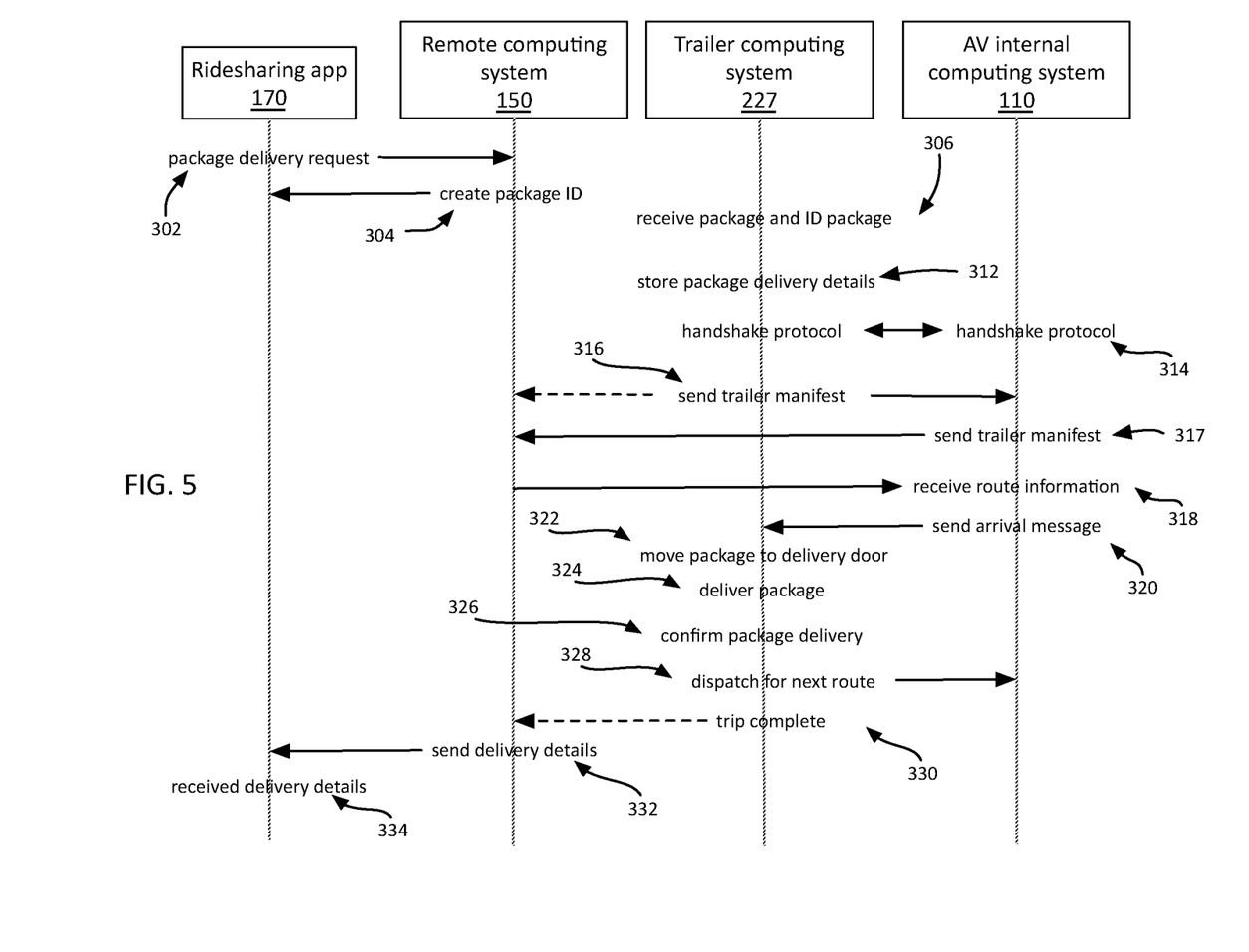
FIG. 5 shows an example ladder diagram showing some communications between devices involved in autonomous package delivery in accordance with some aspects of the present technology.

The communication architecture illustrated in FIG. 4 will be discussed in greater detail in FIG. 5. FIG. 5 shows an example of a possible sequence of communications between ridesharing application 170, remote computing system 150, trailer computing system 227, and AV internal computing system 110.

FIG. 5 begins at step 302 wherein the user operating a client device interacts with the ridesharing application 170 to make a package delivery request (302). The package delivery request (302) can identify characteristics about the package including dimensions and weight as well as a delivery destination for the package. The ridesharing application 170 can send information recorded as part of the package delivery request (302) along with user account information to the remote computing system 150.

The remote computing system 150 can then create a package ID (304). The package ID can include an identification number encoded in an optical machine-readable code or radiofrequency ID (RFID) tag that can be affixed to the package when the package is dropped off or picked up to be delivered. The remote computing system 150 can send the package ID (304) to the ridesharing application 170 so that the user can track the package.

Once the package delivery request (302) is completed, a user can bring the package to a designated drop-off location. In some embodiments, the designated drop-off location may be a store. In some embodiments, the designated drop-off location may be the trailer 210 parked at a nearby location. In some embodiments, the trailer 210 may be summoned to come to the user so that the user may deposit the package into the trailer 210.

In some embodiments, the dropped off packages may be sent to a distribution center to be reorganized for delivery. In some embodiments, the dropped off package may immediately be delivered by the same vehicle which the packages been dropped off. Thus, the present technology can be used in a shipping service model or a courier service model.

When the trailer 210 receives the package, the trailer computing system 227 can identify the package (306) by reading the computer readable code. Optionally, the trailer computing system 227 can request information about the package from remote computing system 150, which can receive information from trailer computing system 227 identifying a package received by the trailer 210, and can send package delivery details to the trailer computing system 227. The trailer computing system 227 can store the package identification in a trailer manifest file (312).

When the trailer 210 becomes hitched to the autonomous vehicle 102, trailer computing system 227 and the AV internal computing system 110 can initiate a handshake protocol (314). The handshake protocol (314) can identify a particular trailer 210 (by a trailer identification code) and a particular autonomous vehicle 102 (by an autonomous vehicle identification code) to each other and can allow the AV internal computing system 110 to verify the status of the sensors on the trailer 210. In response to determining and/or receiving a status of the sensors on trailer 210 as being in an acceptable operating condition, the AV internal computing system 110 can switch to a trailer driving mode. The trailer driving mode can include using a different set of models for interpreting sensor data to account for the use of some sensors on the autonomous vehicle 102 and some sensors on the trailer 210. Additionally, the trailer driving mode also accounts for a larger vehicle size, a wider turning radius, and additional degrees of freedom created by the trailer hitch. As such, when in the trailer driving mode, the AV internal computing system 110 can be configured to perceive the world using a partial set of sensors on the autonomous vehicle 102 and a partial set of sensors on the trailer 210 and can utilize different planning algorithms adapted for safe piloting of the autonomous vehicle 102 towing the trailer 210.

After the handshake protocol (314) is complete, the trailer computing system 227 can send (316) the trailer manifest to the AV internal computing system 110, which can forward (317) the information to the remote computing system 150 along with the trailer identifier so that remote computing system 150 can begin to plan an itinerary for delivering the packages in trailer 210.

Optionally, the trailer computing system 227 can send (316) the trailer manifest directly to the remote computing system 150 along with an identification of the specific autonomous vehicle 102 to which it is hitched so that remote computing system 150 can begin to plan an itinerary for delivering the packages in trailer 210.

In some embodiments, the remote computing system 150, will also continue to schedule pick up of ridesharing passengers around trips to drop off packages. In this way, idle time of the autonomous vehicle 102 can be minimized since the autonomous vehicle 102 can continue to drop off packages when it is not utilized for ridesharing.

The remote computing system 150 is responsible for sending waypoints to AV internal computing system 110 for guiding the autonomous vehicle 102 through an itinerary, whether for the purpose of transporting a ridesharing passenger or delivering a package. As such, the remote computing system 150 can send route plan information as waypoints which are received (318) by the AV internal computing system 110. The autonomous vehicle 102 can navigate to the waypoints until it arrives at the destination when it can send (320) an arrival message to the trailer computing system 227.

Upon receiving the arrival message, the trailer computing system 227 can take the steps necessary to deliver the package that corresponds to the destination. The trailer computing system 227 can utilize the package manipulation mechanism to move (322) the appropriate package to the delivery door 207 and the package release mechanism. The trailer computing system 227 can then cause delivery (324) of the package. In some embodiments, delivery of the package includes depositing the package at or near the package drop-off location. In some embodiments, delivery of the package includes moving the package outside of the trailer 210 so that the package can be accessed by the delivery drone 211, which can deliver the package at a particular delivery zone at the package drop-off location.

Wherever the package is left, trailer computing system 227 can act as a delivery verification system to gather evidence of delivery of the package by using a camera on the trailer 210 or on the delivery drone 211 to take a picture of the package at its delivery location. Ideally, the picture will include package identification information and a visually identifiable attribute of the package drop-off location. In some embodiments, evidence of package delivery will include location coordinates for where the package was deposited.

The trailer computing system 227 can then confirm (326) the package delivery by sending a message to the AV internal computing system 110. Optionally, the same message can be sent to the remote computing system 150. The trailer computing system 227 can then send (328) a dispatch message to the AV internal computing system 110 alerting the AV internal computing system 110 that package delivery is complete and that the autonomous vehicle 102 can depart for its next itinerary.

The AV internal computing system 110 can send a trip complete message (330) including confirmation of package delivery to the remote computing system 150. The remote computing system 150 can then send delivery details (332) to the ridesharing application 170 which can receive the delivery details (334) and present them to the user that requested delivery of the package.

As explained above, FIG. 5 utilized a communication model whereby the trailer computing system 227 only directly communicated with the AV internal computing system 110. Dashed lines in FIG. 5 illustrate optional embodiments wherein the trailer computing system 227 could optionally communicate directly with the remote computing system 150. The primary embodiment is preferred for improved security to ensure that trailer computing system 227 does not become compromised. This is critical because the trailer computing system 227 operates on one end of a high-bandwidth data link with the AV internal computing system 110. Since a trusted line of communication already exists between remote computing system 150 and the AV internal computing system 110 it is preferable to limit communications to that trusted link. However, it is technically feasible to open additional lines communication between remote computing system 150 and the trailer computing system 227.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Figure 6:
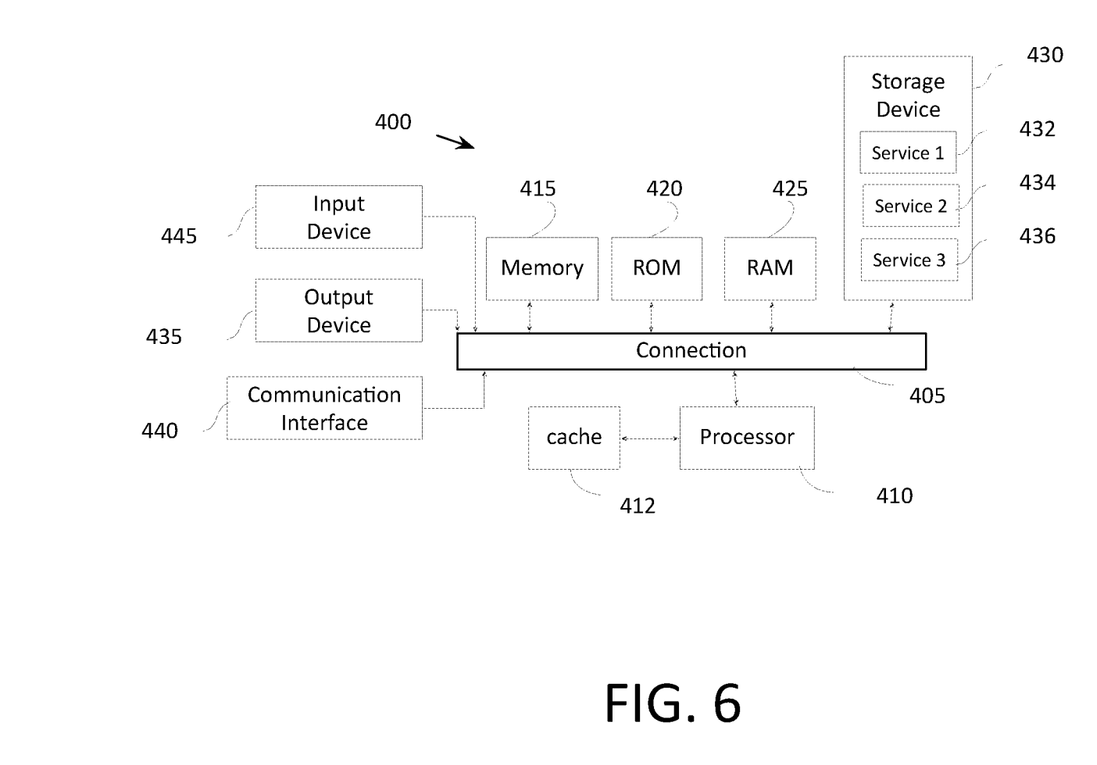
FIG. 6 shows an example system for implementing certain aspects of the present technology.

FIG. 6 shows an example of computing system 400, which can be for example any computing device making up AV internal computing system 110, remote computing system 150, passenger device executing rideshare application 170, trailer computing system 227, or any component thereof in which the components of the system are in communication with each other using connection 405. Connection 405 can be a physical connection via a bus, or a direct connection into processor 410, such as in a chipset architecture. Connection 405 can also be a virtual connection, networked connection, or logical connection.

In some embodiments, computing system 400 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 400 includes at least one processing unit (CPU or processor) 410 and connection 405 that couples various system components including system memory 415, such as read-only memory (ROM) 420 and random access memory (RAM) 425 to processor 410. Computing system 400 can include a cache of high-speed memory 412 connected directly with, in close proximity to, or integrated as part of processor 410.

Processor 410 can include any general purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. There is no restriction on operating on any particular hardware arrangement, and therefore the basic features here may easily be substituted for improved hardware or firmware arrangements as they are developed.

Storage device 430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A trailer to an autonomous vehicle (AV) that is utilized for transporting ridesharing passengers, the trailer comprising:

at least one sensor, wherein the at least one sensor is a radar, lidar, visual camera, or infrared camera mounted to a surface of the trailer;
a trailer computing system that includes software code for handshaking with an AV internal computing system, and putting the AV internal computing system into a trailer mode, the trailer computing system being configured to communicate with a remote computing system; and
a data connection configured to transport data from the at least one sensor, and configured to connect to the autonomous vehicle after a handshake procedure with the autonomous vehicle over the data connection, whereby data from the at least one sensor is provided to the AV internal computing system,
wherein the trailer computing system is further configured to communicate with a remote computing system over the data connection and through the autonomous vehicle when the trailer is connected to the autonomous vehicle.

2. The trailer of claim 1, further comprising:
a trailer battery; and
a high voltage connector to connect the trailer battery to the autonomous vehicle.

3. The trailer of claim 2, further comprising:
a trailer computing system for controlling operations of the trailer battery including sharing charge with the autonomous vehicle or drawing charge from the autonomous vehicle.

4. The trailer of claim 3, wherein the trailer computing system is configured to detect a position of the trailer, and configured to cause the high voltage connector to disconnect from the autonomous vehicle when the trailer is in an unstable position.

5. The trailer of claim 1, wherein the software code for handshaking can identify a particular trailer and a particular autonomous vehicle to each other and can allow the AV internal computing system to verify a status of the sensors on the trailer, wherein the putting the AV internal computing system into a trailer mode occurs after the verification of the status of the sensors on the trailer.

6. The trailer of claim 1, wherein after the handshaking the trailer computing system can send a trailer manifest to the AV internal computing system for forwarding to the remote computing system so that remote computing system can begin to plan an itinerary for delivering packages in trailer.

7. An autonomous vehicle (AV) with a trailer hitched to the autonomous vehicle for combined use for autonomously transporting rideshare passengers and autonomous delivery of a package comprising:
a communication interface configured to communicate with a remote computing system to receive a route plan to autonomously navigate the autonomous vehicle with the package to a package drop-off location;
an AV internal computing system configured to receive the package drop-off location, and the route plan to autonomously navigate the autonomous vehicle with the package to the package drop-off location;
a trailer computing system that includes software code for handshaking with the AV internal computing system, and putting the AV internal computing system into a trailer mode, the trailer computing system being configured to communicate with a remote computing system; and
a data connection configured to carry communications between the trailer computing system and the autonomous vehicle computing system.

8. The autonomous vehicle with the trailer hitched to the autonomous vehicle of claim 7, comprising:
a delivery verification system configured to collect data regarding evidence of delivery of the package, the evidence of delivery including one of a picture of the package at the package drop-off location, a positive identification of the package outside of the autonomous vehicle at the package drop-off location, or package location coordinates.

9. The autonomous vehicle with the trailer hitched to the autonomous vehicle of claim 7 comprising:
a package identification device including an optical scanner or an RFID tag reader, the package identification device configured to identify the package upon receiving the package in the autonomous vehicle,
wherein the package identification device is configured to communicate the package identification to the communication interface, wherein the communication interface is configured to utilize the package identification to communicate with a server to receive the package drop-off location.

10. The autonomous vehicle with the trailer hitched to the autonomous vehicle of claim 7 comprising:
at least one package arrangement motor configured to drive a belt or wheel, the at least one package arrangement motor configured to move the package to a location within the autonomous vehicle for transport, and to move the package to a package drop mechanism when the autonomous vehicle is at the package drop-off location.

11. The autonomous vehicle with the trailer hitched to the autonomous vehicle of claim 7, wherein the autonomous vehicle includes a passenger compartment, and a trailer for transporting the package.

12. The autonomous vehicle with the trailer hitched to the autonomous vehicle of claim 7, wherein the AV internal computing system is further configured to receive a passenger drop-off location, and a passenger route plan to autonomously navigate the autonomous vehicle with a passenger to the passenger drop-off location.

13. The autonomous vehicle with the trailer hitched to the autonomous vehicle of claim 7, comprising a package delivery drone releasably mounted to a trailer of the autonomous vehicle, the package delivery drone configured to collect the package from the trailer, and to transport the package to a package delivery zone at the package drop-off location.

14. A computing system for a delivery trailer comprising:
a non-transitory computing system readable medium storing computing system executable instructions; and at least one processor for executing the computing system executable instructions, the instructions effective to cause the computing system to:
perform a handshake procedure with an autonomous vehicle utilized for transporting rideshare passengers over a data connection shared with the autonomous vehicle, wherein the handshake procedure includes communicating a system status to the autonomous vehicle, wherein the handshake procedure is effective to put the autonomous vehicle into a trailer mode;
exclusively communicate with a remote computing system over the data connection and through the autonomous vehicle when the trailer is connected to the autonomous vehicle.

15. The computing system of claim 14, wherein the instructions are effective to cause the computing system to:
   receive a message from the autonomous vehicle informing the computing system that the delivery trailer has arrived at a delivery location for an identified package.

16. The computing system of claim 14, wherein the instructions are effective to cause the computing system to:
   send a delivery confirmation message to the autonomous vehicle, whereby the autonomous vehicle is informed that it can depart a delivery location.

17. The computing system of claim 14, wherein the instructions are effective to cause the computing system to:
   receive data from at least one sensor, wherein the at least one sensor is a radar, lidar, visual camera, or infrared camera mounted to a surface of the delivery trailer; and
   send the data from the at least one sensor to the autonomous vehicle to be used by the autonomous vehicle in the autonomous piloting of the autonomous vehicle.

18. The computing system of claim 14, wherein the instructions are effective to cause the computing system to:
   report a charge level of a battery to the autonomous vehicle.

19. The computing system of claim 14, wherein the instructions are effective to cause the computing system to:
   determine a weight distribution of the delivery trailer; and
   report weight distribution information to the autonomous vehicle.

* * * * *